(12) United States Patent
Koberstein et al.

(10) Patent No.: US 10,011,155 B2
(45) Date of Patent: Jul. 3, 2018

(54) NESTED HVAC LINES

(71) Applicant: FORD GLOBAL TECHNOLOGIES, LLC, Dearborn, MI (US)

(72) Inventors: Manfred Koberstein, Troy, MI (US); Thomas Owen Mills, Saline, MI (US); David James Leone, Trenton, MI (US); Loren John Lohmeyer, III, Monroe, MI (US); Gregory Trombley, Grosse Ile, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/424,149

(22) Filed: Feb. 3, 2017

(65) Prior Publication Data
US 2017/0259644 A1    Sep. 14, 2017

Related U.S. Application Data

(60) Provisional application No. 62/306,999, filed on Mar. 11, 2016.

(51) Int. Cl.
| F16L 9/18 | (2006.01) |
| B60H 1/00 | (2006.01) |
| F25B 41/00 | (2006.01) |
| F16L 11/20 | (2006.01) |

(52) U.S. Cl.
CPC ....... B60H 1/00571 (2013.01); F25B 41/003 (2013.01); F16L 9/18 (2013.01); F16L 11/20 (2013.01)

(58) Field of Classification Search
CPC .... F16L 11/20; F16L 11/22; F16L 9/18; F16L 9/19; F16L 39/005; F25B 41/003
USPC ........ 138/114–117, 106, 108; 285/41, 123.1, 285/123.15, 123.16
See application file for complete search history.

(56) References Cited

U.S. PATENT DOCUMENTS

| 384,860 A | * | 6/1888 | Meehan ............... F16L 7/00 138/102 |
| 1,761,281 A | * | 6/1930 | Taub ................ F28B 1/02 138/114 |
| 3,136,965 A | * | 6/1964 | Lunden ............... H01P 3/123 138/114 |

(Continued)

FOREIGN PATENT DOCUMENTS

| CN | 102095293 A | 6/2011 |
| CN | 203323323 U | 12/2013 |

(Continued)

OTHER PUBLICATIONS

English Machine Translation of CN102095293A.

(Continued)

*Primary Examiner* — Patrick F Brinson
(74) *Attorney, Agent, or Firm* — Vichit Chea; King & Schickli PLLC

(57) ABSTRACT

A heating, ventilation, and air-conditioning (HVAC) conduit includes a first HVAC line at least partially nested within a second HVAC line having a configuration defining a U- or C-shaped receiver in cross-section. The first HVAC line is fabricated of a first material and the second HVAC line is fabricated of a second material that is different from the first material.

19 Claims, 8 Drawing Sheets

(56) References Cited

U.S. PATENT DOCUMENTS

| | | | | |
|---|---|---|---|---|
| 4,410,013 A | * | 10/1983 | Sasaki | B21C 37/154 |
| | | | | 138/113 |
| 4,930,544 A | * | 6/1990 | Ziu | F16L 7/00 |
| | | | | 138/111 |
| 6,009,908 A | | 1/2000 | Hartnagel et al. | |
| 6,659,134 B2 | * | 12/2003 | Navis | A61M 1/285 |
| | | | | 138/116 |
| 7,753,413 B2 | | 7/2010 | Yoshino et al. | |
| 7,882,856 B2 | * | 2/2011 | Berry, Jr. | F16L 7/00 |
| | | | | 138/108 |
| 2005/0067038 A1 | * | 3/2005 | Kobayashi | F16L 59/022 |
| | | | | 138/149 |

FOREIGN PATENT DOCUMENTS

| | | |
|---|---|---|
| CN | 204677916 U | 9/2015 |
| JP | 2011235782 A | 11/2011 |

OTHER PUBLICATIONS

English Machine Translation of CN203323323U.
English Machine Translation of CN204677916U.
English Machine Translation of JP2011235782A.

* cited by examiner

NESTED HVAC LINES

This application claims the benefit of priority in U.S. Provisional Patent Application Ser. No. 62/306,999 filed on 11 Mar. 2016, the full disclosure of which is incorporated herein by reference.

TECHNICAL FIELD

This disclosure relates generally to vehicle heating, ventilation, and air conditioning (HVAC) systems. More particularly the disclosure relates to vehicle HVAC conduits comprising nested HVAC lines allowing convenient co-routing/co-packaging of HVAC lines such as low and high pressure HVAC lines.

BACKGROUND

It is well known to provide a vehicle heating, ventilation, and air conditioning (HVAC) system to control an interior temperature and humidity of a vehicle passenger cabin, typically by utilizing pressure differences to transfer heat from low-temperature regions to high-temperature regions of the HVAC system by principles of conduction and convection. Such HVAC systems differ in various aspects of design, fabrication, and operation. However, most vehicle HVAC systems include at least five major components: 1) an evaporator; 2) a compressor; 3) a condenser; 4) a receiver/drier; and 5) an expansion device.

The typical HVAC system is also divided into two pressure regions. The representative HVAC system 100 schematic presented in FIG. 1 includes a high pressure side 102 comprising the condenser 104 and the receiver/drier unit 106, and a low pressure side 108 comprising the evaporator 110. An arbitrary dividing line L between the high pressure region 102 and the low pressure region 108 passes through the compressor 112 and the expansion device 114. Arrows A illustrate the flow of refrigerant through the system 100.

As is also well-known, the evaporator 110 is a heat exchange device that comprises coils for passing refrigerant therethrough to absorb heat from air that is blown over the coils by a fan 111. Refrigerant passes through the evaporator 110 from bottom to top, absorbing heat from the air and boiling the refrigerant to produce low temperature, low pressure vapor. The compressor 112 absorbs the vapor refrigerant via a suction line 116 and superheats it by compression. As refrigerant flows across the compressor 112 it also removes the heat of compression, motor heat, mechanical friction heat, and other heat absorbed in the suction line 116. The compressor 112 also generates a flow of refrigerant in the HVAC system.

The condenser 104 is another heat exchanger comprising coils that cool refrigerant vapor sufficiently to condense it to a liquid, releasing heat from the system. Refrigerant flows through the condenser 104 typically from top to bottom, cooling sufficiently to convert back to a liquid. Heat released during the cooling of the refrigerant is removed by a fan 113. This heat in some HVAC designs is used to assist in warming the vehicle passenger cabin.

The receiver/drier unit 106 filters refrigerant to remove contaminants, and also includes a desiccant to remove excess moisture from the system. The receiver/dryer 106 also stores extra refrigerant during periods of low cooling demand. The expansion device 114 generates a pressure difference causing liquid refrigerant to boil into vapor, that is, by creating a pressure drop by restricting the flow of refrigerant through the HVAC system 100. This slowing of refrigerant flow causes the compressor 112 to partially evacuate one side of the HVAC system 100, creating a low pressure void sometimes called the "suction side" or "low side" of the system.

The typical HVAC system also includes multiple hoses and/or pipes (collectively referred to as "lines") for moving high and low pressure liquids and vapors between and through the HVAC components as summarized above. These include the suction line 116 as discussed above, and also other high and low pressure lines 118 designed to allow circulation of a variety of fluids at varying temperatures and pressures through the HVAC system 100. It will be appreciated that by the terms "high" and "low" pressure lines, it is meant that the lines are fabricated to withstand varying degrees of temperature and/or pressure imposed by the fluids (liquids, vapors, gases, etc.) passed through and/or generated by the HVAC system 100 as summarized above. Conventionally, high and low pressure lines are separate and separately routed through the HVAC system 100 and/or the vehicle (not shown) underbody area, under-hood region, etc. This imposes engineering challenges in routing the lines, as the separately routed lines require additional packaging space that can be difficult to find in the modern motor vehicle wherein hundreds if not thousands of components must be packaged in the vehicle underbody and under-hood areas.

Moreover, high pressure lines are typically fabricated of more heat/pressure-resistant materials such as metals, including without intending any limitation aluminum and alloys. These high pressure lines are engineered to withstand extremes of internal temperature and pressure imposed by the fluids being transported therethrough. On the other hand, low pressure lines which are not required to transport fluids placed under high temperature and/or high pressure are often for reasons of cost fabricated of less heat/temperature-resistant materials such as plastics. Because the low pressure lines must still be routed through and around the vehicle motor and also vehicle underbody areas which may be generating heat and/or which may be prone to impacts such as from road debris, at least portions of the low pressure lines must often be protected to prevent damage, such as by heat and/or impact-resistant shielding. This further increases cost.

To solve this and other problems, the present disclosure relates at a high level to an HVAC conduit, and to HVAC systems incorporating same. Advantageously, the described conduit includes a more temperature, pressure, and impact-resistant HVAC line nested with a less temperature, pressure, and impact-resistant HVAC line. By such conduits, high and low pressure HVAC lines may be conveniently co-routed in and through vehicle areas such as the underbody area, under-hood region, etc. Moreover, the more temperature, pressure, and impact-resistant HVAC line serves to protect the less temperature, pressure, and impact-resistant HVAC line, thus obviating or reducing the need to provide dedicated shielding for that purpose.

SUMMARY

In accordance with the purposes and benefits described herein, in one aspect a heating, ventilation, and air-conditioning (HVAC) conduit is described, comprising a first HVAC line at least partially nested with a second HVAC line. The second HVAC line defines a receiver configured to receive at least a portion of a length dimension of the first HVAC line therein. The receiver defined by the second HVAC line may be U- or C-shaped in cross-section.

In embodiments, the first HVAC line is fabricated of a first material and the second HVAC line is fabricated of a second material that is different from than the first material. In one embodiment, the first HVAC line is fabricated of a plastic or polymer and the second HVAC line is fabricated of a metal, which may be aluminum or an alloy. Optionally, a connector may be provided securing the first HVAC line to the second HVAC line. In embodiments, the connector is one or more of a strap, a band, a sheath, a sleeve, and a bracket surrounding at least a portion of the nested first and second HVAC lines. In other embodiments, the nested first and second HVAC lines may be dimensioned or otherwise configured to provide a secure friction or interference fit therebetween.

In another aspect, vehicle heating, ventilation, and air-conditioning (HVAC) systems are provided, comprising a plurality of HVAC lines adapted for transport of high and low pressure fluids. The system further includes one or more HVAC conduits comprising a low pressure HVAC line at least partially nested within a high pressure HVAC line. The high pressure HVAC line defines a receiver configured to receive at least a portion of a length dimension of the low pressure HVAC line therein.

In embodiments, the low pressure HVAC line is fabricated of a first material and the high pressure HVAC line is fabricated of a second material that is different from the first material in, e.g., properties of temperature and/or pressure resistance. In one embodiment, the low pressure HVAC line is fabricated of a plastic or polymer and the high pressure HVAC line is fabricated of a metal. In embodiments, the metal is an aluminum or an alloy thereof. An optional connector as described above may be provided to secure the low pressure HVAC line to the high pressure HVAC line.

In yet another aspect, vehicle heating, ventilation, and air-conditioning (HVAC) systems are described, comprising a plurality of HVAC lines adapted for transport of high and low pressure fluids through and between the high pressure side and the low pressure side. The system further includes one or more HVAC conduits comprising a plastic low pressure HVAC line at least partially nested within a metal high pressure HVAC line.

In the following description, there are shown and described embodiments of an HVAC conduit. As it should be realized, the device is capable of other, different embodiments and its several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of an HVAC conduit, and together with the description serve to explain certain principles thereof. In the drawings.

Reference will now be made in detail to embodiments of the disclosed HVAC conduit, examples of which are illustrated in the accompanying drawing figures wherein like reference numerals identify like features.

DETAILED DESCRIPTION

Figure 1:
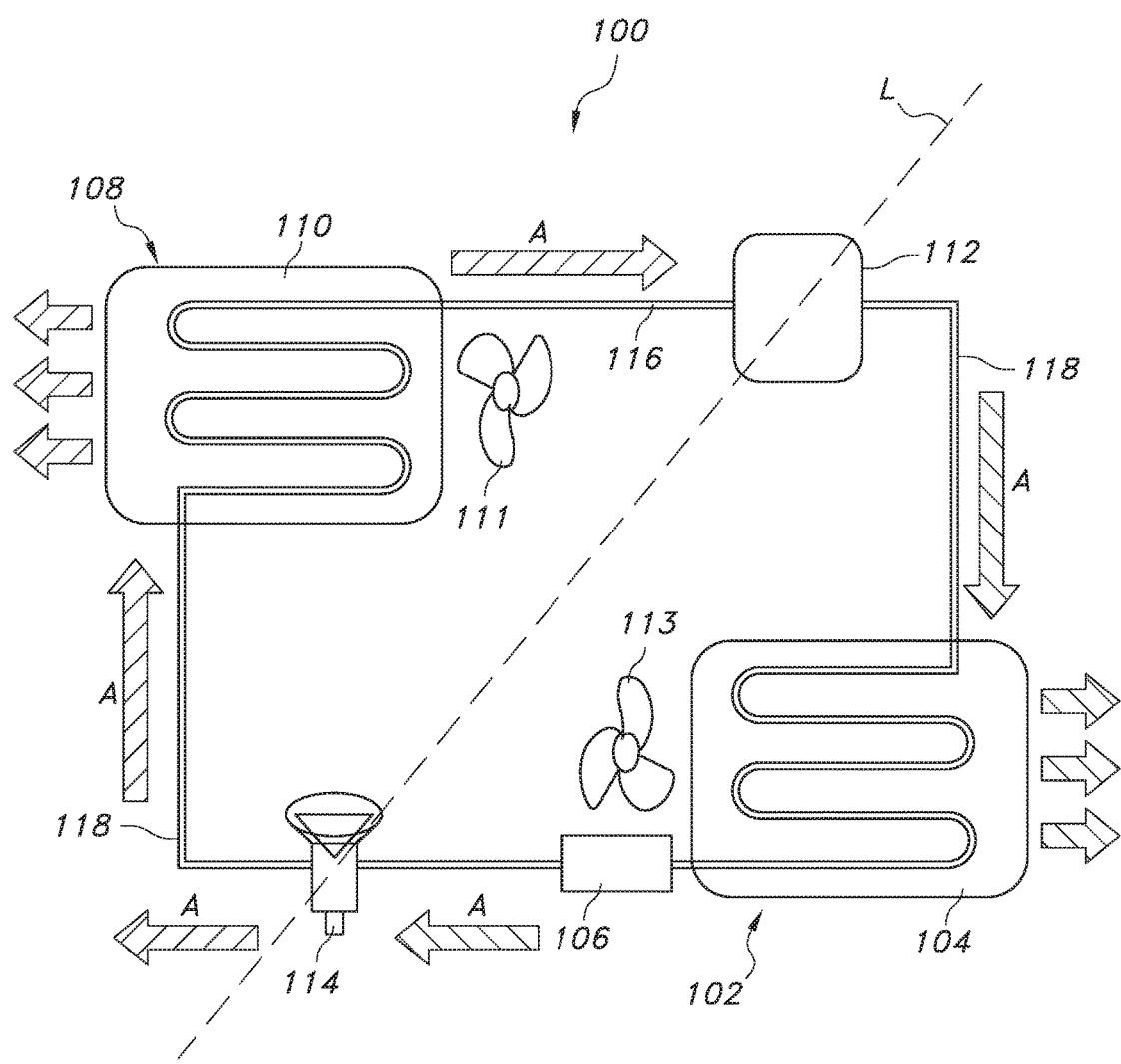
FIG. 1 depicts a representative prior art vehicle HVAC system.
Figure 2:
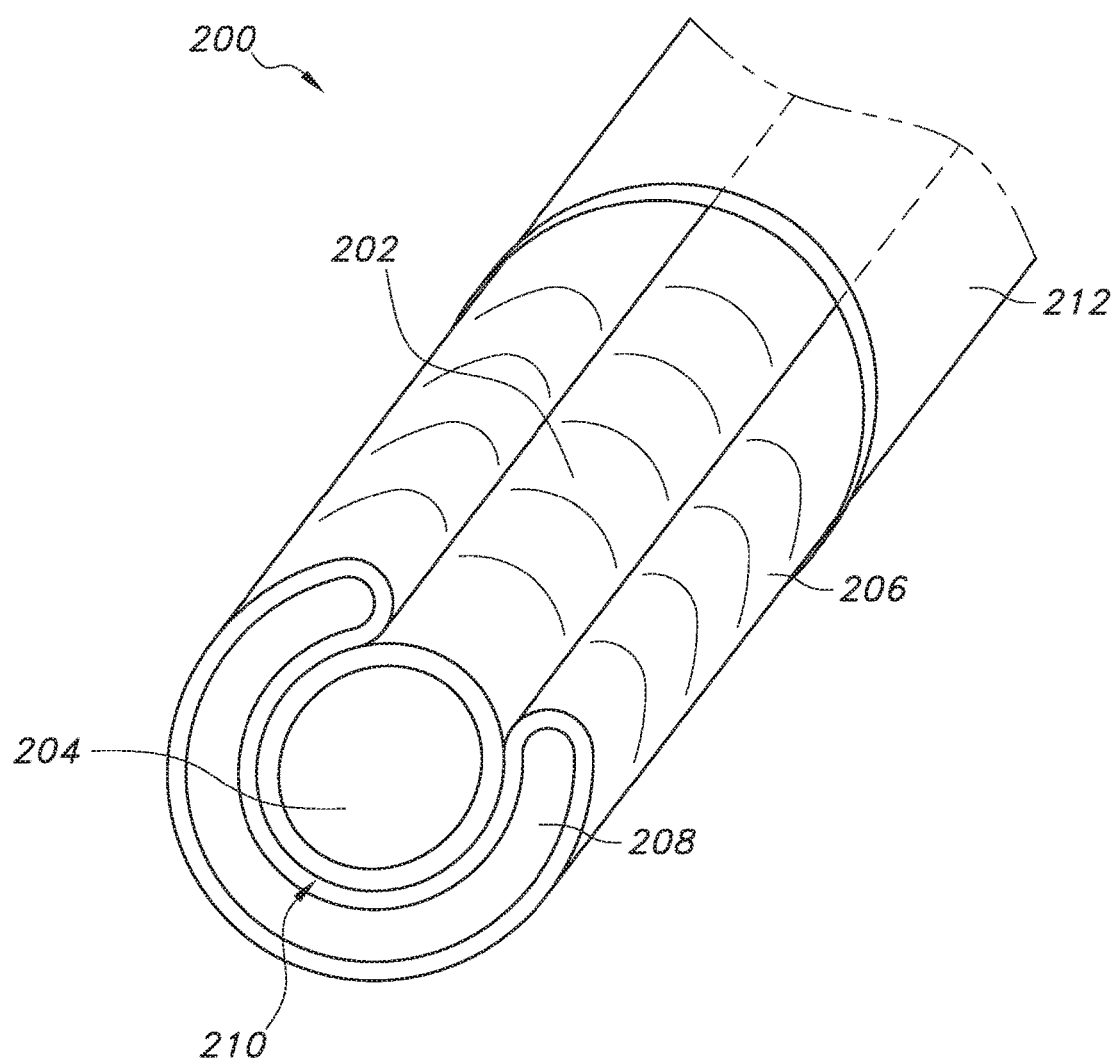
FIG. 2 depicts an embodiment of an HVAC conduit according to the present description.

FIG. 2 illustrates an embodiment of an HVAC conduit 200 according to the present disclosure. As shown the conduit 200 includes a first HVAC line 202 defining an interior lumen 204 allowing passage of a fluid, nested with a second HVAC line 206 defining an interior lumen 208 allowing passage of a fluid. In the depicted embodiment, the first HVAC line 202 defines a substantially cylindrical exterior dimension having a substantially circular cross section. The second HVAC line 206 is configured to define a receiver 210 for the first HVAC line 202. In the depicted embodiment, the second HVAC line 206 defines in cross-section substantially a C- or U-shaped receiver 210, dimensioned to receive at least a portion of an exterior cross-sectional dimension of the first HVAC line 202 therein.

The receiver 210 may be dimensioned for a suitably snug fit to prevent inadvertent dislodgement of the first HVAC line 202. Optionally, a connector 212 may be provided to secure the first HVAC line 202 to the second HVAC line 206, thereby ensuring that the two lines will not separate, for example due to vibration encountered during vehicle operation. Non-limiting examples of suitable connectors 212 include straps, bands, brackets, and sheaths or sleeves surrounding at least a portion of an exterior circumference and/or a length dimension of the nested HVAC conduit 200.

Figure 3A:
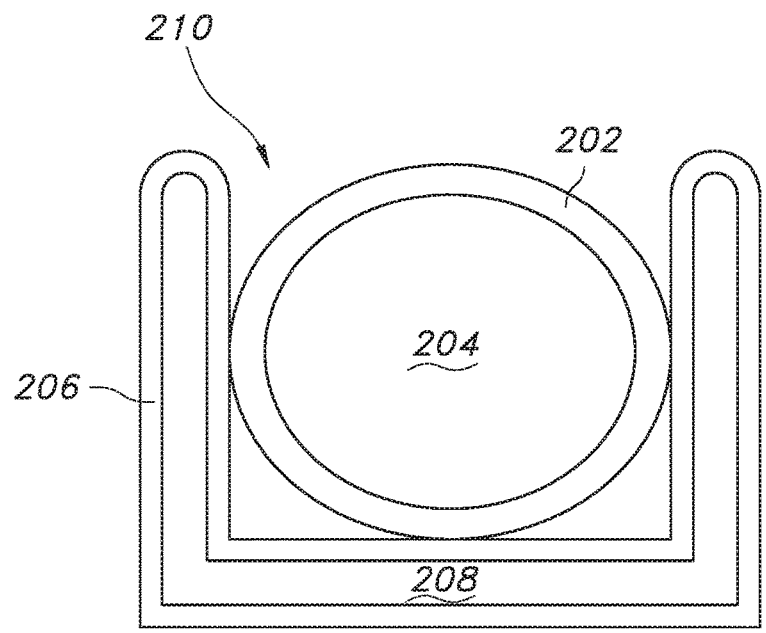
FIG. 3A depicts an alternative embodiment of the HVAC conduit of FIG. 2.
Figure 3B:
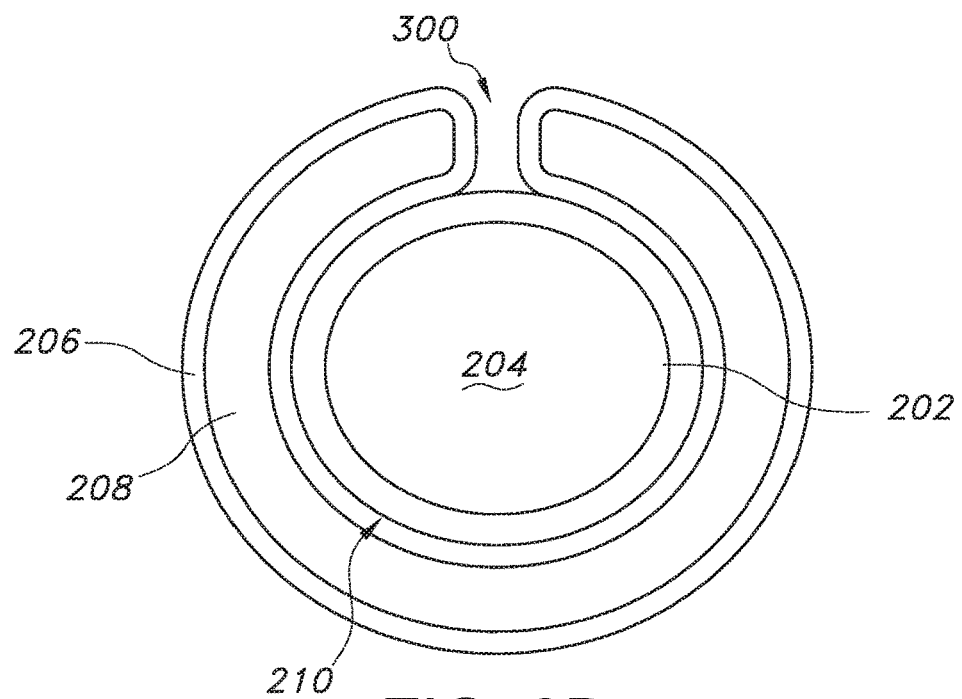
FIG. 3B depicts another alternative embodiment of the HVAC conduit of FIG. 2.
Figure 3C:
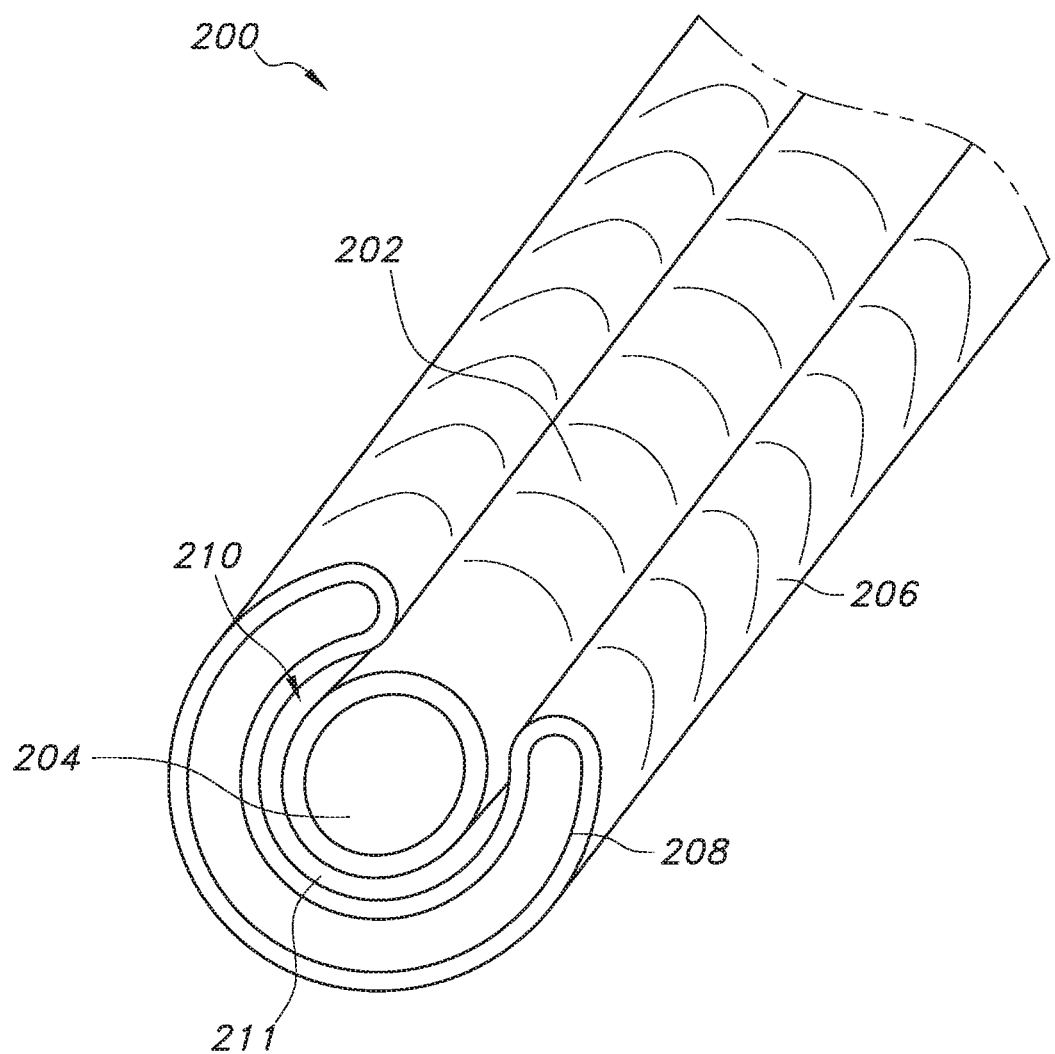
FIG. 3C depicts yet another alternative embodiment of the HVAC conduit of FIG. 2.

In other embodiments (see FIG. 3C), the connectors may be one or more clips 211 disposed on an interior surface of the receiver 210 defined by the second HVAC line 206, the clips being configured and dimensioned for snugly engaging the first HVAC line 202.

Of course, alternative configurations are contemplated for the nested HVAC conduit 200 in accordance with the exterior geometries of the first HVAC line 202 and/or the second HVAC line 206, the particular underbody and/or under-hood location at which the nested HVAC conduit is to be placed, etc. As non-limiting examples (see FIG. 3A), the second HVAC line 206 could define a receiver 210 having a more rectangular exterior and interior cross-section. Still more (see FIG. 3B), the second HVAC line 206 could define a nearly closed semicircular configuration including a gap 300 through which the first HVAC line 202 could be forced during assembly. All such alternative embodiments are contemplated for use herein.

In an embodiment, the first HVAC line 202 is configured as a low pressure HVAC line, that is, is fabricated of a material that is less resistant to temperature and pressure imposed by fluids passing therethrough. In embodiments, the first HVAC line 202 is fabricated of a suitable plastic or polymer.

In an embodiment, the second HVAC line 206 is configured as a high pressure HVAC line, that is, is fabricated of a material that is more resistant to temperature and pressure imposed by fluids passing therethrough, and is also more shock-resistant. In embodiments, the second HVAC line 206 is fabricated of a suitable metal, for example an aluminum or an alloy.

Of course, alternative embodiments are contemplated. For example, the first HVAC line 202 may be configured as a high pressure HVAC line fabricated of a metal, and the second HVAC line 206 may be configured as a low pressure HVAC line fabricated of a plastic or polymer. All such alternative embodiments are contemplated.

As will be appreciated, the above-described nested HVAC conduit 200 provides numerous advantages. The second HVAC line 206 of the nested HVAC conduit 200, in addition to its primary function of transporting fluids through portions of an HVAC system 100, provides a temperature and impact shield for the first HVAC line 202, protecting it from heat generated by other vehicle components such as the motor (not shown), etc., and also from impacts such as from road debris thrown up during vehicle travel. Thus, by implementation of the described nested HVAC conduit 200 external shielding is not required, reducing the number of parts required and also cost.

Figure 4A:
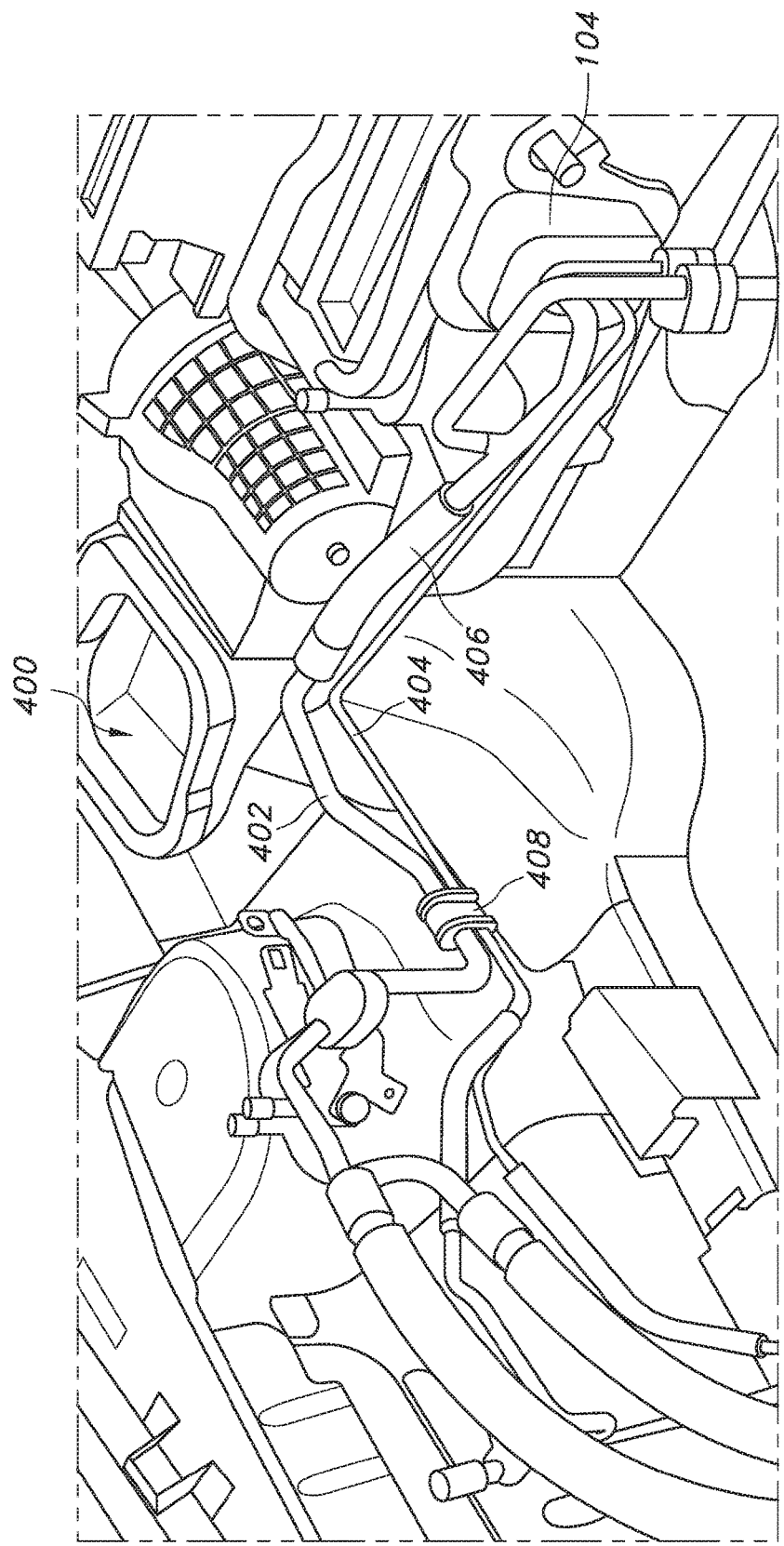
FIG. 4A depicts a prior art under-hood configuration of HVAC lines.

Moreover, use of the described nested HVAC conduit 200 allows co-routing two HVAC lines 202, 206 such as a high pressure HVAC line and a low pressure HVAC line using approximately half of the packaging space that would be required to separately route a low pressure HVAC line and a high pressure HVAC line. For example, as shown in FIG. 4A, conventionally in an under-hood situation near a vehicle motor 400, a separate high pressure HVAC line 402 and a low pressure HVAC line 404 would be provided, routed between an HVAC case (not shown) and the condenser 104 and compressor (not shown). Each line 402, 404 would then potentially require separate shielding 406, separate brackets or a single larger bracket 408 capable of individually securing both lines, etc. All these components contribute to increased requirements for packaging space, increased cost of parts and so cost of manufacture, etc.

Figure 4B:
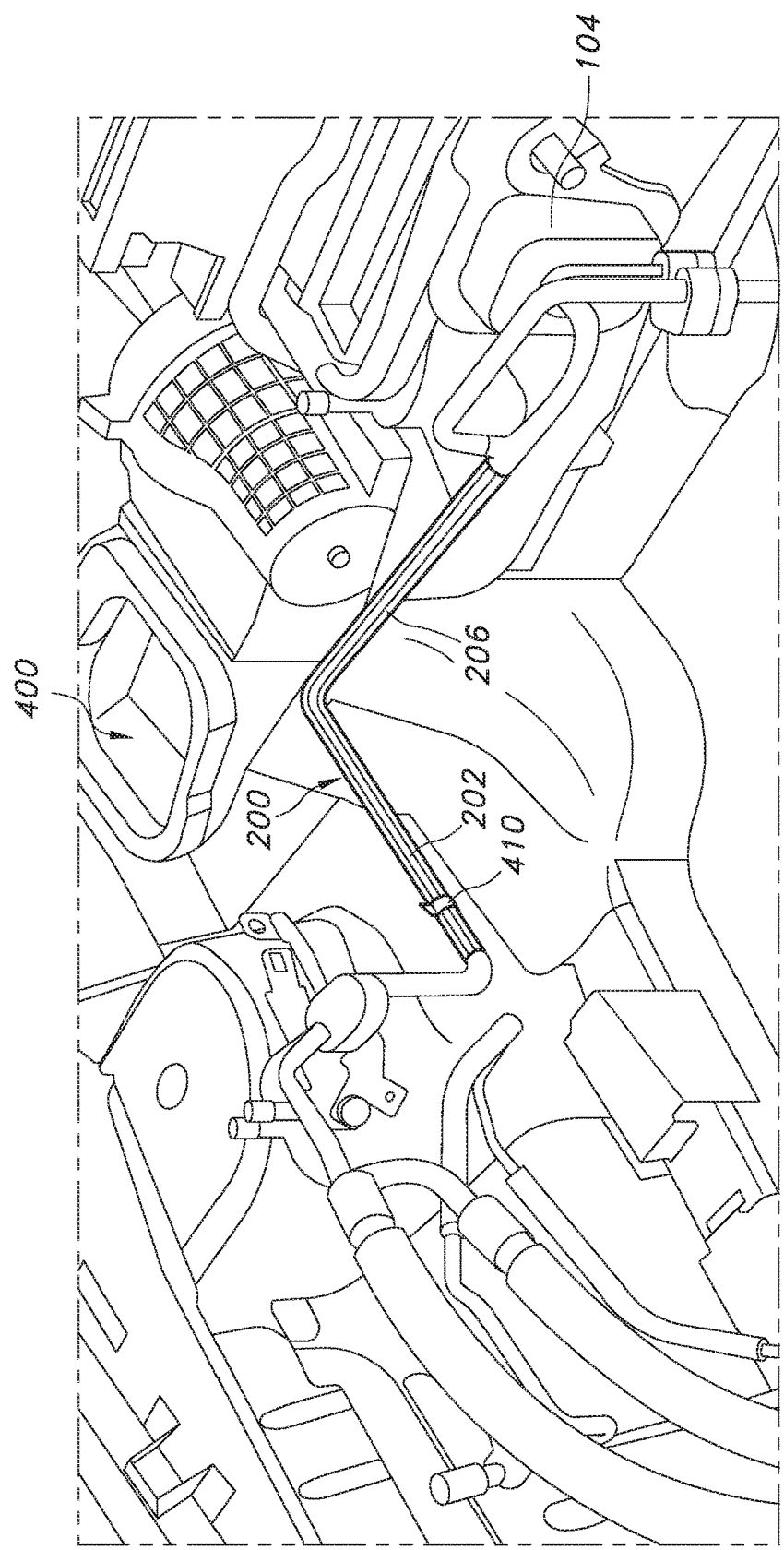
FIG. 4B depicts the under-hood configuration of FIG. 4A using the HVAC conduit of FIG. 2.

On the other hand, as shown in FIG. 4B use of the presently described nested HVAC conduit 200 reduces the required packaging space by approximately half, allowing co-routing of both the high and low pressure HVAC lines in substantially the space required for a single line, and in the depicted embodiment necessitating only a single, smaller bracket 410 to support the lines.

In another example, it is well known to provide auxiliary HVAC systems for vehicles. These auxiliary HVAC systems may be substantially identically configured to primary HVAC systems as described above, or may be an air-conditioning-only or heater-only system. Auxiliary HVAC systems are often positioned either in the rear trim assembly, a center console, under a seat, or otherwise within the vehicle passenger compartment. Auxiliary HVAC systems are used to provide or supplement climate control in portions of vehicles that may not be efficiently reached by the primary HVAC system, for example to control temperature, humidity, etc. in rear portions of multi-passenger vehicles such as sport-utility vehicles, vans, mini-vans, etc.

Figure 5A:
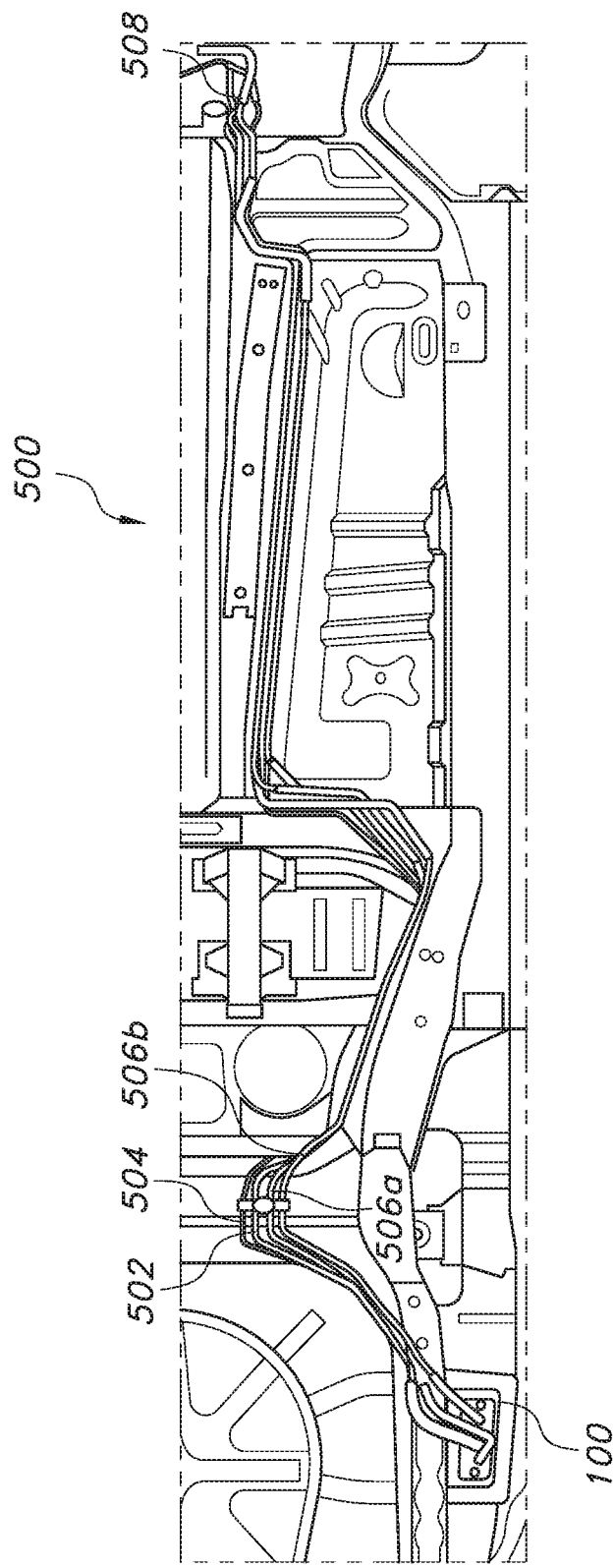
FIG. 5A depicts a prior art underbody configuration of HVAC lines for an auxiliary HVAC system.

As shown in FIG. 5A, typically various high pressure HVAC lines and low pressure HVAC lines are provided routed under the vehicle chassis 500, i.e. an underbody routing. For example, among other HVAC lines there may be provided a high pressure HVAC liquid line 502 and a low pressure HVAC suction line 504, and other high and/or low pressure HVAC lines 506a, 506b. These HVAC lines 502, 504, 506a, 506b provide fluid communication between the auxiliary HVAC case 508 and the primary HVAC unit 100. The underbody HVAC lines 502, 504, 506a, 506b potentially require separate shielding, separate brackets, etc., contributing to increased packaging space requirements, increased cost of parts and so cost of manufacture, etc.

Figure 5B:
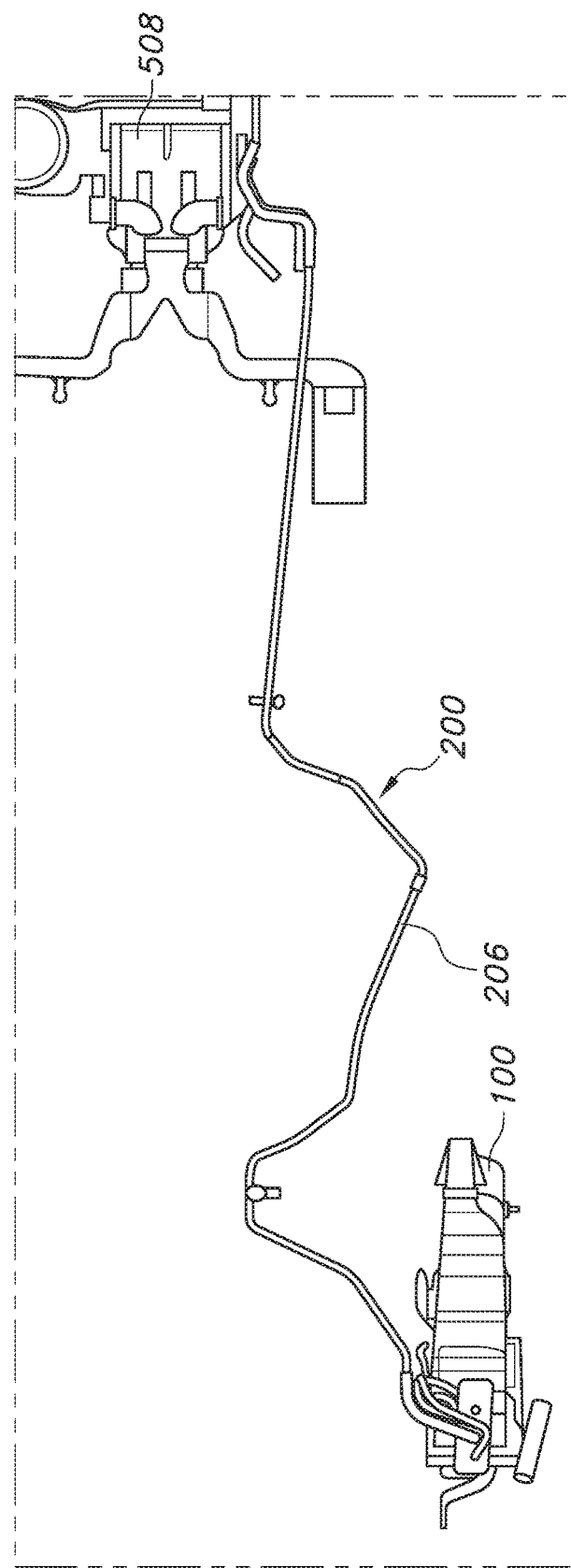
FIG. 5B depicts the underbody configuration of FIG. 5A using the HVAC conduit of FIG. 2.

On the other hand, as shown in FIG. 5B the above configuration of a high pressure HVAC liquid line 502 and a low pressure HVAC suction line 504, replaced by the nested HVAC conduit 200 of the present disclosure wherein the first HVAC line 202 (not visible in this view) serving as the suction line 504 is nested within the second HVAC line 206 serving as the liquid line 502, reduces the required packaging space by approximately half, allowing co-routing of both the high and low pressure HVAC lines in substantially the space required for a single line.

Obvious modifications and variations are possible in light of the above teachings. All such modifications and variations are within the scope of the appended claims when interpreted in accordance with the breadth to which they are fairly, legally and equitably entitled.

What is claimed:

1. A heating, ventilation, and air-conditioning (HVAC) conduit, comprising a first HVAC line at least partially nested within a second HVAC line having a configuration defining a U- or C-shaped receiver in cross-section;
   wherein the first HVAC line is fabricated of a first material and the second HVAC line is fabricated of a second material that is different from the first material.

2. The HVAC conduit of claim 1, wherein the second HVAC line defines an open receiver configured to engage at least a portion of a length dimension of the first HVAC line therein.

3. The HVAC conduit of claim 2, wherein the first HVAC line is fabricated of a plastic or polymer.

4. The HVAC conduit of claim 2, wherein the second HVAC line is fabricated of a metal.

5. The HVAC conduit of claim 4, wherein the metal is aluminum or an alloy thereof.

6. The HVAC conduit of claim 1, further including a connector securing the first HVAC line to the second HVAC line.

7. The HVAC conduit of claim 6, wherein the connector is one or more of a strap, a band, a sheath, a sleeve, and a bracket holding at least a portion of the nested first and second HVAC lines.

8. A vehicle heating, ventilation, and air-conditioning (HVAC) system comprising a plurality of HVAC lines adapted for transport of fluids at a high temperature and/or pressure and a plurality of HVAC lines adapted for transport of fluids at a low temperature and/or pressure, further including one or more HVAC conduits each comprising a first HVAC line at least partially nested within an open receiver defined by a second HVAC line.

9. The HVAC system of claim 8, wherein the first HVAC line is fabricated of a first material and the second HVAC line is fabricated of a second material having a different resistance to high temperature and/or pressure than the first material.

10. The HVAC system of claim 9, wherein the first HVAC line is a low pressure HVAC line fabricated of a plastic or polymer.

11. The HVAC system of claim 9, wherein the second HVAC line is a high pressure HVAC line fabricated of a metal.

12. The HVAC system of claim 9, wherein the second HVAC line is a low pressure HVAC line fabricated of a plastic or polymer.

13. The HVAC system of claim 8, wherein the first HVAC line is a high pressure HVAC line fabricated of a metal.

14. A vehicle heating, ventilation, and air-conditioning (HVAC) system, comprising:
a high pressure side;
a low pressure side;
a plurality of HVAC lines adapted for transporting high pressure fluids and low pressure fluids through and between the high pressure side and the low pressure side; and
one or more HVAC conduits comprising a plastic or polymer low pressure HVAC line at least partially nested with a metal high pressure HVAC line.

15. The HVAC system of claim 14, wherein the metal high pressure HVAC line defines an open receiver configured to engage at least a portion of a length dimension of the plastic low pressure HVAC line therein.

16. The HVAC system of claim 14, wherein the plastic or polymer low pressure HVAC line defines an open receiver configured to engage at least a portion of a length dimension of the metal high pressure HVAC line therein.

17. The HVAC system of claim 14, wherein the metal is aluminum or an alloy thereof.

18. The HVAC system of claim 14, further including a connector securing the plastic low pressure HVAC line to the metal high pressure HVAC line.

19. The HVAC system of claim 18, wherein the connector is one or more of a strap, a band, a sheath, a sleeve, and a bracket holding at least a portion of the plastic low pressure and metal high pressure HVAC lines.

* * * * *